Figure 1:
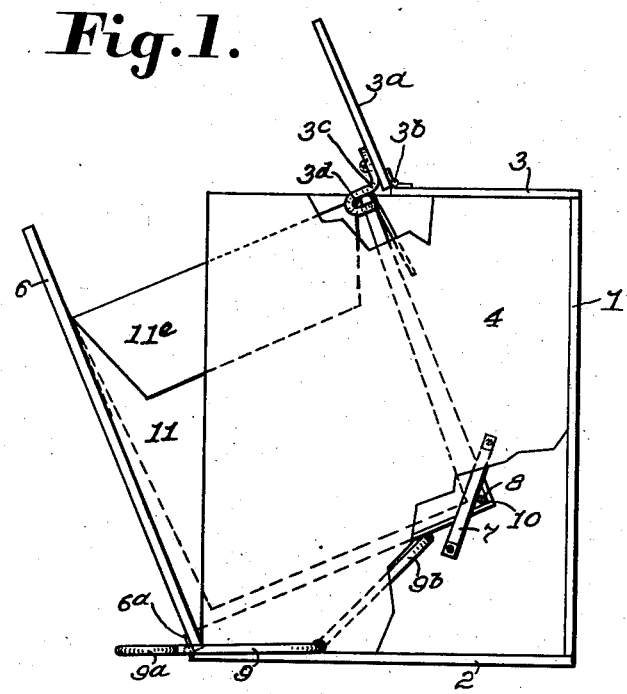

June 22, 1943.  W. E. HEITHOFF  2,322,439
REFUSE CONTAINER
Filed Dec. 23, 1940

Fig. 5.  Fig. 6.  Fig. 7.

Inventor
William E. Heithoff,
G. C. Kennedy
Attorney

Patented June 22, 1943

2,322,439

UNITED STATES PATENT OFFICE 2,322,439

REFUSE CONTAINER

William E. Heithoff, Dika, Iowa

Application December 23, 1940, Serial No. 371,337

1 Claim. (Cl. 312—155)

My invention relates to improvements in separable refuse containers, and particularly to such as combine an inner separable container for refuse within a housed and tiltable container or receptacle which latter in turn is hingedly mounted in an open front casing, permitting the inner casing to be removed when filled from the tiltable container.

One object of my invention is to provide a hinged top cover part having a releasable connection to the tiltable container when tipped forwardly to an open position to receive refuse in an inner removable casing therein.

Another object of my invention is to supply mechanical means operable from without the outer container to tip the inner hinged receptacle to an open position to permit the inner casing to be seated therein or removed therefrom conveniently manually.

Another object of my invention is to provide other means such as a stop device or means for separable coaction mounted respectively on the tippable container and on one inner wall of the outermost container, to hold the said tippable container in a forwardly tilted position while the inner casing is being placed in said tippable container or being removed therefrom.

Another object of my invention is the mounting of a medially crimped rock-shaft within the lower inner part of the outermost container, having a foot pedal thereon positioned without said container for rocking the tippable inner container outwardly by means of the crimped part of the rockshaft when said hinged cover part is rocked upwardly by means of the linking releasable connections between said cover part and the tiltable receptacle.

Another object of my invention is the shaping of the removable inner casing or garbage receptacle to fit within the tiltable container, and in constructing it for being collapsed together when not in use, and in the addition at the open top parts of the container or garbage receptacle of bendable flaps at four sides thereof, of which an opposite pair are foldable over each other when the receptacle is filled, and the other opposite pair may be bent inwardly in superposition, one of the flaps being transversely slotted to receive therethrough an opposite triangular flap, for use not only as a closure, but having its outer termination usable when bent upwardly as a fingerhold in lifting the casing when filled with garbage or other substances.

I have successfully used my invention in actual practice for the above uses. The outer casing, also the inner tippable casing may be made from wood or other material or metal as desired.

It is to be understood that various changes may be adopted in the different elements of my invention, without departing from this invention or the scope of the claims herein.

Figure 2:
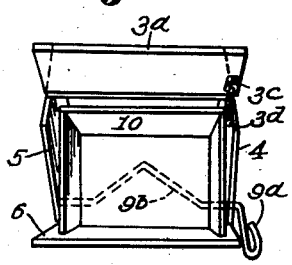
Figure 3:
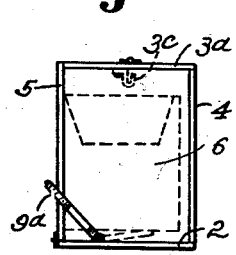
Figure 4:
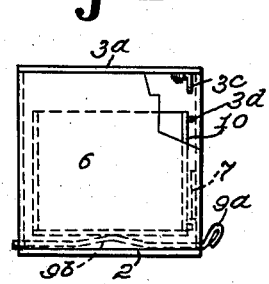
Figure 4:
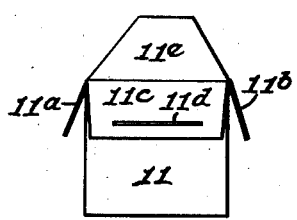
Figure 4:
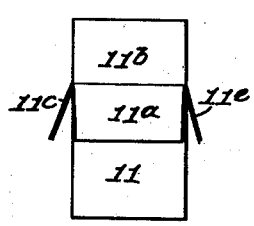
Figure 4:
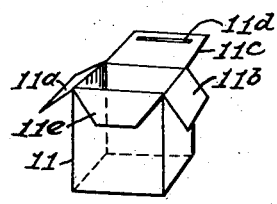

Fig. 1 is a side elevation of my invention with portions of the hither side wall broken away, and showing the inner tippable container in an open position, with parts shown in dotted lines. Figs. 2 to 7 are displayed on a reduced scale. Fig. 2 is a front elevation of my invention as completely opened. Fig. 3 is a side wall elevation of the outer container as collapsed, with the innermost refuse receptacle indicated in dotted lines. Fig. 4 is a front elevation of my invention as closed, with a corner portion of the front wall broken away. Fig. 5 is an elevation of the inner refuse receptacle as removed from the tiltable receptacle, and showing the top flaps extended. Fig. 6 is a side elevation of the receptacle shown in Fig. 5. Fig. 7 is a perspective view of the same.

Referring first to said Fig. 1, where the front wall 6 is tilted open on its hinges 6a, the outer housing has a bottom plate 2, a rear wall 1, side walls 4 and 5, and a top wall, consisting of a rigid part 3 and a rockable part 3a hinged at 3b to the forward end of the part 3. The numeral 3c denotes an open hook depending from the part 3a into the housing, and shown in open position.

The tiltable front wall 6 has an inwardly directed open top box 10 fixed thereon, with the bottom of the box spaced from the floor member 2, and has on the side wall and right hand upper part of the box 10 an outwardly directed stud 3d, shown as received in the hooked member 3c to releasably retain the box 10 in open tilted position.

In Figs. 1 to 4, are shown pedal operating means for rocking the open top box 10 together with the front wall 6 to a forwardly opening position as hinged at the lower edge of said wall at 6a. This means consists of a rigid rod 9 having a looped handle part 9a without the housing side wall 4, being bent to the front, whereby the rod 9, which is seated through the housing side wall apertures therefor rockably, has within the lower part of the housing a medial part 9b bent angularly slopingly upward as shown in Fig. 1, to contact with the bottom of the inner box 10. I have provided a spaced bar 7 fixed inclinedly on the lower inner face of the housing wall 4, and a short pin 8 fixed on the adjacent lower rear corner wall of the box 10 projects laterally, whereby when the box 10 is tilted rearwardly to the position shown in Fig. 1, it is stopped by the pin 8, to place and support the box 10 in a forwardly tilted position when in use. It will be understood, that when the looped part 9a of the rod 9 has been pushed as a pedal downwardly, the oblique part 9b of the rod will engage and rock to an open position the box 10. When the pedal member 9a is released, the box 10 will drop to close the front wall 6, thus releasing the pin 3d at the same time from the hook 3c, allowing the cover part 3a to move downwardly to a closed position, and lifting the looped rod part 9a.

It will be understood, that the innermost receptacle 11 may be constructed of foldable or other shape as desired, and may be made of flexible or rigid material, or liquid proof for continued use.

I claim:

In combination, in a separable refuse container, an outer housing having side walls, a rear wall, a bottom floor, an outwardly tiltable hinged front wall and a top wall composed of a segmental top cover with a rear section peripherally fixed to the upper edges of said rear and side parts, a top closure member hinged to the forward part of the segmental top cover and having a depending fixed upwardly open hook rearwardly directed and upturned on the rear part of the lower face thereof, an open top rigid receptacle mounted upon the inner face of the closure member to seat within the container, an inner open top removable flexible sack seated removably in said open top receptacle, a transverse rock-shaft with end parts traversing the lower ends of the side walls with one outer end part bent angularly forwardly, the medial lower part of the rock-shaft being bent rearwardly inclinedly to contact the bottom wall of said rigid receptacle, a stop member projecting inwardly from one inner side wall of the container to releasably interlock with said hook, an upwardly rearwardly inclined spaced looped bar end-supported on an inner face of one side wall of the housing, and a fixed stop laterally directed outwardly on one side face of the rigid receptacle adapted to releasably engage said fixed looped bar when the outer angular part of the rock-shaft is rocked forwardly.

WILLIAM E. HEITHOFF.